United States Patent [19]

Newman

[11] 4,323,926
[45] Apr. 6, 1982

[54] TELEVISION PROJECTOR APPARATUS

[76] Inventor: Ira J. Newman, 6903 NW. 95th Ter., Tamarac, Fla. 33321

[21] Appl. No.: 115,377

[22] Filed: Jan. 25, 1980

[51] Int. Cl.³ .............................................. H04N 5/74
[52] U.S. Cl. .................................... 358/237; 358/254
[58] Field of Search ................ 358/237, 231, 250, 254

[56] References Cited

U.S. PATENT DOCUMENTS 4,202,015  5/1980  Udo et al. ............................ 358/237
4,209,807  6/1980  Arita .................................... 358/237

*Primary Examiner*—Richard Murray
*Attorney, Agent, or Firm*—LeBlanc, Nolan, Shur & Nies

[57] ABSTRACT

A television projector apparatus is provided for projecting an enlarged image from the viewing screen of a television receiver. The projector apparatus is designed to allow the television receiver to be initially installed in an upright position for convenient adjustment and alignment and to be subsequently tilted into an operative position with its viewing screen inclined toward a mirror which reflects the television image from the viewing screen to a projector lens to project an enlargement of the image. Preferably, the entire unit is adapted to tilt from an installation or placement position into an operative position to project the enlarged image in a desired direction. Alternatively, the projector unit is provided with a pivotal platform which allows the television receiver to be installed in a horizontal position and to be tilted into its operative position.

4 Claims, 15 Drawing Figures

TELEVISION PROJECTOR APPARATUS

The present invention relates to a television projector apparatus and, more particularly, to an apparatus for projecting an enlarged image from a television receiver. Specifically, this invention relates to a projector unit especially suited for use with a portable television receiver to magnify and project an enlarged image of the viewing screen of the receiver onto a viewing surface. The apparatus is readily adaptable for use with any portable television receiver and is designed to correct the picture inversion caused by projection lenses without requiring the television receiver to be modified in any way.

There are two basic types of television projectors known as "rear projection" and "front projection" systems. Rear projection systems are constructed so that an enlarged image from a television receiver is projected onto the rear of a viewing screen, i.e., the opposite side of the screen from which it is viewed. Front projection systems are constructed so that the enlarged image is reflected from the viewing screen back to the audience. Thus, the enlarged image is viewed from the same side of the screen toward which it is projected. In front projection systems, the viewer may be positioned between the projector and screen, or the projector may be positioned between the viewer and screen.

In projecting a television image with a standard type of lens system, it is necessary to design the projector to compensate for and correct the inversion and reversal was originally viewed. In other words, simply turning the television receiver upside-down will afford proper viewing in a rear projection system. However, the upside-down orientation of the television receiver can have detrimental effects on its operation such as distortion of the television image. Alternatively, the horizontal and vertical leads of the television receiver may be reversed to produce a television image which is turned upside-down. Again, the image will be correctly viewed in a rear projection system. However, with its horizontal and vertical leads reversed, the television receiver cannot be used for normal viewing without a switching system. Moreover, the reversal of the leads with or without installation of a switch, will void the manufacturer's warranty.

Although the upside-down orientation of the television receiver in a rear projection system will result in proper viewability of the projected image without modification of the television receiver, such a system has serious drawbacks. The size of the television viewing screen is severly limited and the quality of the television picture is greatly diminished. To improve picture quality and accommodate larger screens, the projector units would have to be so large that compact design would be impossible.

The other method for inverting the television image used in a straight-in-line front projection system is to electrically invert the image by reversing only the vertical leads. Reversal of the television image is not necessary because the frontal projection system inherently achieves reversal of the image. The viewer observes the projected image in the opposite direction from which he views the television screen. In effect, he has turned by 180° to view the image from the other side. Thus, in a frontal projection system, inversion of the television image is the only correction required for proper viewing of the projected image. Here again, however, with its vertical leads reversed, the television receiver can not be used for normal viewing without a switching system. Furthermore, the reversal of the leads with or without installation of the switch will void the manufacturers warranty on the television receiver.

Another method which is used to correct the orientation of the image in front projection systems involves deviating from the straight in-line configuration by using a mirror.

One such use of a mirror involves turning the television receiver upside down, which will obviously both invert and reverse the television image. The mirror is then used to correct the image right-to-left.

Another such use of a mirror in front projection systems involves positioning the television receiver on its back, or in a position with the viewing screen facing upwards at an angle. The mirror is then used to correct the image top-to-bottom.

Both such uses of a mirror have great limitations, however. The abnormal positions of the television receiver would make it difficult to construct a projector unit which could readily adapt to fit differently sized and shaped television receivers. Furthermore, it would be extremely difficult to make a projector unit which could fit together with differently sized and shaped television receivers in a way which is stable and safe. Moreover, this abnormal positioning of the television receiver would necessitate handling the receiver in a way which could be difficult and dangerous.

A primary goal of the invention is to construct a projector unit which employs a conventional television receiver and corrects the lens inversion without requiring any modifications of the receiver. It is also intended to construct a projector unit which is readily adaptable to any conventional television receiver and relatively compact and inexpensive in comparison with prior art units. See, for example, U.S. Pat. Nos. 4,021,105 and 4,058,837 which disclose television projector units of more complex structure.

The present invention provides a television projector apparatus for use in a front projection system in which the necessary correction for inversion of the image is achieved by use of a mirror to reflect the image from the receiver. The mirror is employed in combination with a projector lens to produce a projected image with the proper top-to-bottom orientation for viewing. Since the front projection arrangement inherently corrects the image reversal, the projected image also has the proper right-to-left orientation.

Another goal of the invention is to provide a projector unit which minimizes the effort required in placement and alignment of the television receiver on the projector apparatus and removal of the receiver from the apparatus. Since even portable television receivers, particularly color television sets, can be heavy and cumbersome to handle, the projector apparatus must be designed to simplify the manual effort required to install and remove the television receiver. It is also highly advantageous to provide a projector unit which permits easy access for adjustment of the controls of the television receiver.

The present invention contemplates a television projector apparatus for use in a front projection system which is especially adapted to facilitate placement, alignment and removal of the television receiver. The television projector apparatus includes a housing adapted to receive the television receiver in an upright position and to tilt the receiver into an operative position to project an enlarged image from the television receiver in a desired direction. In one embodiment of the invention, the housing includes a platform on which the television receiver is initially supported upright and the entire housing itself is adapted to tilt into the operative position. Alternatively, in another embodiment, the housing includes a pivotal platform for supporting the television receiver. The platform is movable from a horizontal position in which the receiver is installed to an inclined position in which the receiver is tilted into its operative position.

In accordance with the invention, an apparatus for projecting an enlarged image from a television receiver comprises a housing, reflector means located within the housing, support means mounted on the housing for supporting the television receiver in a position oriented toward the reflector means, lens means mounted on the housing for receiving an image reflected by the reflector means from the television receiver and projecting an enlargement of the image, wherein the housing is adapted to tilt the television receiver into an operative position inclined toward the reflector means to project the enlarged image in a desired direction. Preferably, the housing includes a window opening for receiving the viewing screen of the television receiver, and the support means comprises a platform mounted on the housing adjacent to the window opening to support the television receiver with its viewing screen received in the window opening. Preferably, to accommodate television receivers with different sized viewing screens, viewing screens oriented at different angles and/or different heights to the base, and viewing screen disposed both above, below, and to one side of the set controls, the platform is adjustable in height and angle and one or more inserts are provided which receive the viewing screen of the television receiver and fit within the window opening. These features will subsequently be described in greater detail. In addition, the apparatus may include a light barrier located within the housing between the television receiver and the projector lens for blocking a direct light path therebetween. Preferably, the base of the housing itself is adapted to tilt to bring the television receiver, reflector and lens into proper position to project the enlarged television image. Height adjustment means may be provided on the base of the housing for adjusting the angle at which the enlarged image is projected.

Alternatively, the invention is embodied in a television projector apparatus comprising a housing, reflector means located within the housing, support means movably mounted on the housing for supporting the television receiver which is movable from a first position with the television receiver upright to a second position with the television receiver inclined toward the reflector means, and lens means mounted on the housing for receiving an image reflected by the reflector means from the television receiver with the receiver in its second, inclined position and projecting an enlargement of the image. Preferably, the support means comprises a platform pivotally attached to the housing. The platform includes a flat base for supporting the television receiver and a frame member extending perpendicularly upward from the base and adapted to receive the viewing screen of the television receiver. The apparatus may include one or more inserts adapted to fit around said frame member and receive the viewing screen of the television receiver to accommodate different sized viewing screens, or screens with different orientations relative to the controls or to the base.

Accordingly, it is a primary object of the present invention to provide a television projector apparatus which is designed to permit easy installation, alignment, and removal of the television receiver.

It is also an object of the invention to provide a television projector apparatus for use in a front projection system which achieves correction for inversion of the projector lens without modification of the television receiver.

Another object of the invention is to provide a television projector apparatus which is easily adaptable to accommodate different television receivers having different sized viewing screens, of for example 9 to 15 inches, screens oriented at different heights and/or different angles to the base, and screens disposed in different positions relative to the controls.

It is another object of the invention to provide a television projector apparatus which permits the television receiver to be initially installed in an upright position and to be tilted into an inclined position when it is desired to project an enlarged image from the television receiver.

It is a further object of the invention to provide a television projector apparatus which avoids the need to turn the television receiver upside-down or to reverse the leads for its picture tube to produce a correct image for viewing.

These and other objects will be readily apparent with reference to the drawings and following description wherein.

Figure 1:
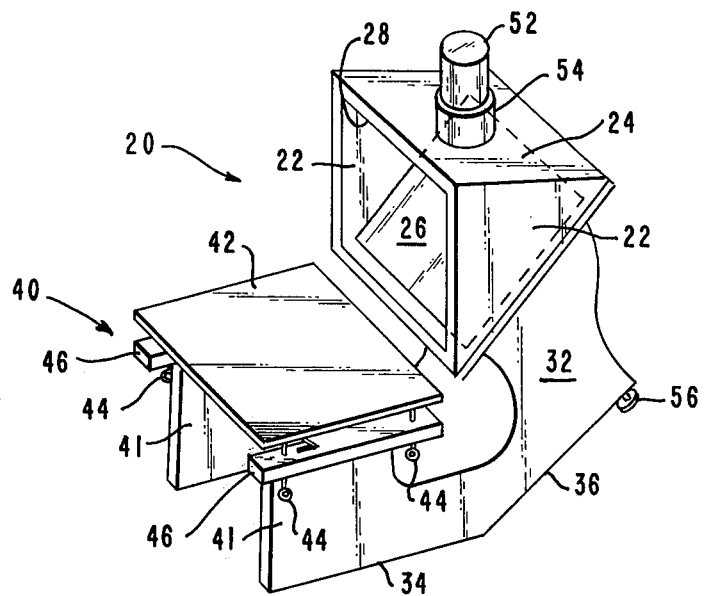
FIG. 1 is an overall perspective view of a television projector apparatus embodying the principles of the present invention.
Figure 2:
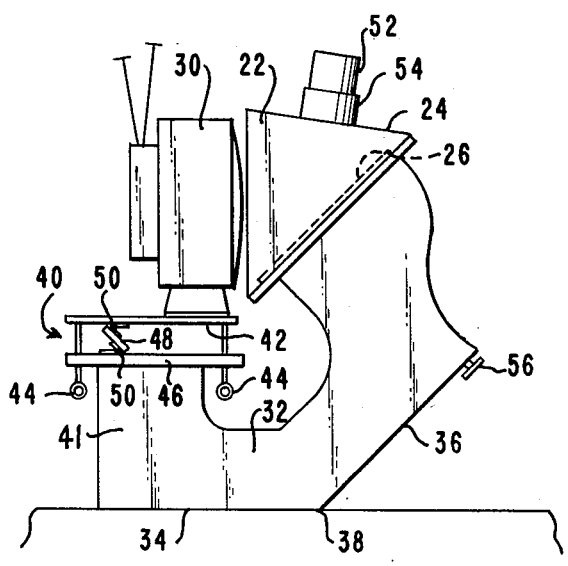
FIG. 2 is a side elevation view illustrating the television projector apparatus in its preparation position for installation of a television receiver.

Referring to FIG. 1, a television projector apparatus, generally 20, includes a housing comprising a pair of upstanding side walls 22 and an inclined front wall 24. A mirror 26 of the primary surface type is located within the projector housing and disposed horizontally between the side walls 22. A window opening 28 is provided in the rear wall of the projector housing for receiving the viewing screen of a television receiver 30 (FIG. 2). Preferably, the window opening is constructed to receive the viewing screen of a small, e.g., 12" or 13", portable television receiver. However, it may be made smaller or larger to receive other sized television screens. The inside of the projector housing may be lined or coated with a flat black material to absorb rather than reflect light.

Figure 3:
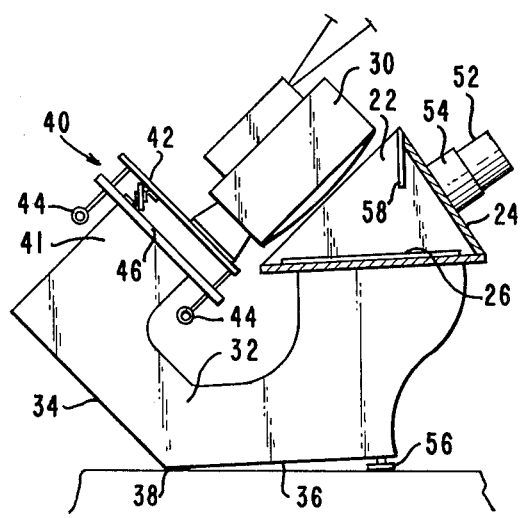
FIG. 3 is a side elevation, partially in section, of the television projector apparatus tilted into its operative position to project an enlarged image from the television receiver.

The projector housing includes a pair of base members 32 which extend downwardly from its side walls 22. Each base member 32 includes a pair of straight, bottom edges 34 and 36 which intersect at a corner 38 (FIG. 2) and allow the television projector apparatus to assume two different angular orientations, i.e., a preparation position (FIG. 2) or a projection position (FIG. 3). Preferably, the projector housing is made of plastic or any other conventionl material and is designed to rest on the floor. If desired, a cube-shaped cover (not shown) may be provided to cover the projector and serve as a coffee table. If necessary, an antenna can be mounted on the cube and connected to the receiver.

A television support, generally 40, is attached to a pair of upstanding legs 41 provided on base members 32 for supporting television receiver 30 with its viewing screen received within window opening 28 in a position oriented toward mirror 26. Support 40 comprises a flat, rectangular platform 42 adjustably mounted via a set of elongated screw members 44 to a pair of support members 46 secured to legs 41 of base members 32. Screw members 44 allow the height and angle of platform 42 to be adjusted to accommodate television receivers with different sized screens and/or screens disposed at different heights or at different angles relative to the plane containing the base. A flat board 48 is connected by a set of hinges 50 to platform 42 and support members 46 to enhance the stability of the platform.

A projector lens 52 is mounted on front wall 24 of the projector housing for receiving a television image reflected by mirror 26 from the viewing screen of television receiver 30 and projecting an enlargement of the image. Preferably, projector lens 52 could have a focal length of approximately 12 inches and a f/ratio in the range of f/1.0-f/2.6. Several acceptable lens are commercially available as will be obvious to those skilled in the art. Different types of lens having different properties may be used within the scopes of this invention. Projector lens 52 is adjustably mounted on front wall 24, e.g., via a sleeve 54, to permit the projected image to be focused.

Referring to FIG. 2, projector unit 20 is titled backward to rest on rear edges 34 when television receiver 30 is installed on platform 42. The platform is thus oriented in a substantially horizontal position to allow television receiver 30 to be installed in an upright position on the projector unit. The horizontal orientation of platform 42 allows television receiver 30 to be manually shifted and aligned in window opening 28 with mirror 26 and lens 52. Screw members 44 may be turned to adjust the desired height and angle of platform 42. A foam or rubber gasket (not shown) may be installed around window opening 28 to provide a protective cushion between the television viewing screen and the projector housing to prevent scratching or marring of the receiver. Since only the television viewing screen is received within window opening 28, the projector unit provides easy access to the television control knobs for adjustment of the television image, volume control and on-off operation. In addition, the design of the housing provides stability with or without a television receiver 30 on platform 42.

When it is desired to project an enlargement of the television image, projector unit 20 is titled forward about its corners 38, as shown in FIG. 3, to support the projector housing on front edges 36. In this position the receiver 30 is stabilized to a greater extent than if it were resting in an upright position on a table. A pair of adjustable feet 56 (one shown) is provided on base members 32 to adjust the height of the projector housing and the angle at which the enlarged image is projected. The image from the viewing screen of television receiver 30 is directed toward mirror 26 from which it is reflected into projector lens 52 which projects an enlarged image on a viewing surface (not shown). Mirror 26 serves to invert the television image which is reinverted by projector lens 52 and projected onto the viewing surface in the correct top-to-bottom orientation for viewing. Projector lens 52 also reverses the television image from right-to-left. However, since the projector unit is used in a front projection system, and since this use of the mirror does not effect the right-to-left orientation of the television image, the correct right-to-left orientation of the projected image appears on the viewing screen.

Preferably, as shown in FIG. 3, a light barrier 58 is mounted within the projector housing for blocking a direct light path between projector lens 52 and the viewing screen of television receiver 30. Thus, light barrier 58 assures that only the reflected image from mirror 26 is directed to projector lens 52. If desired, light barrier 58 may be adjustable in height to allow the projector unit to be used with different television receivers.

Figure 7:
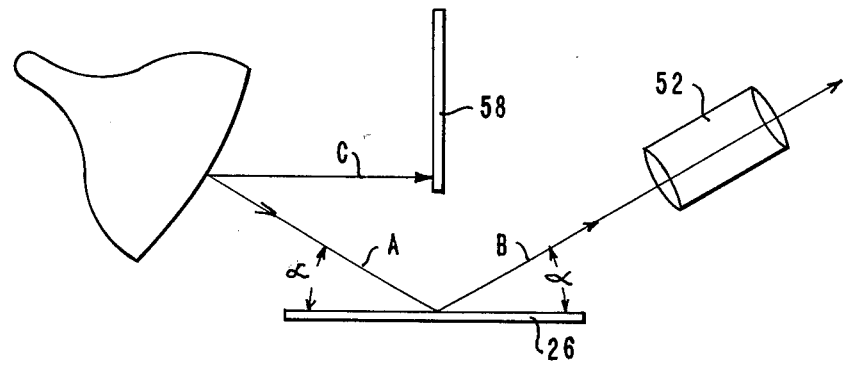
FIG. 7 is a schematic view illustrating the relationship of the television picture tube, reflecting mirror, projector lens and light barrier in the television projector apparatus.
Figure 9:
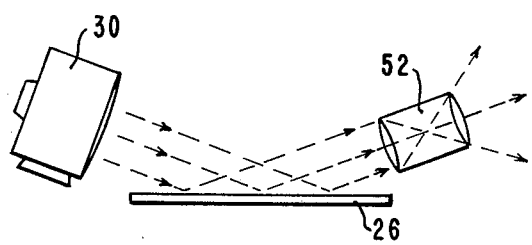
FIGS. 9–11 illustrate alternative orientations of the television receiver, mirror, and projector lens.
Figure 10:
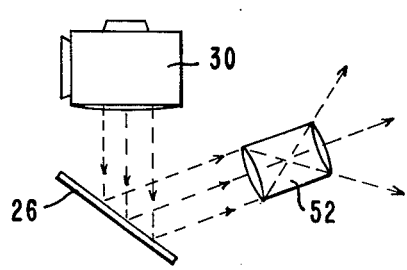
Figure 11:
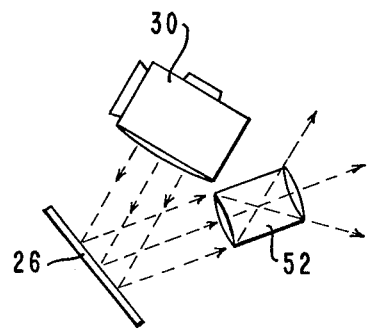

The basic operating principles of the projector unit are illustrated in FIG. 7 which shows that the center lines A and B of the television picture tube and projector lens 52, respectively, are inclined at the same angle $\alpha$ relative to mirror 26. Preferably, the television projector apparatus is constructed to provide an angle $\alpha$ of 45°. However, as shown in FIG. 9, other angular orientations, e.g., between 2° and 88°, may be employed. As shown in FIGS. 10 and 11, with the projector in its operative position, mirror 26 may be inclined, rather than horizontal, with television receiver 30 and projector lens 52 located in appropriate positions to project an enlarged image from the television receiver. Preferably, the angle of projection, i.e., the optical axis of lens 52 (line b of FIG. 7), will range from a minimum of about 10° below horizontal to a maximum of about 80° above horizontal. Further, the axis of the television picture tube (line A of FIG. 7) is oriented at least 2° below and no more than 135° below the horizontal. The preferred orientation of the picture tube axis is between 30° and 90° below the horizontal. Light barrier 58 is interposed between the television picture tube and projector lens 52 to block a direct light path along line C therebetween.

As shown in FIGS. 7 and 9-11, the projector unit projects an enlarged image along an upwardly inclined angle which is not usually perpendicular to the viewing surface (not shown). Thus, unless some correction is made, the projected image will lack the ability to simultaneously focus the top and bottom of the projected image because of the difference in distance of the top and bottom of the viewing surface from the projector lens. The required correction can be accomplished by either a slight tilting of the platform and window, which will result in a tilting of the receiver viewing screen, or by a slight tilting of the mirror, or by a tilting of the lens, or by any appropriate combination thereof. The plane containing the window opening must be perpendicular to the axis of the picture tube. Tilting the platform will provide the adjustment required between sets wherein the axis is at a different angle to the plane containing the base of the receiver.

Figure 4:
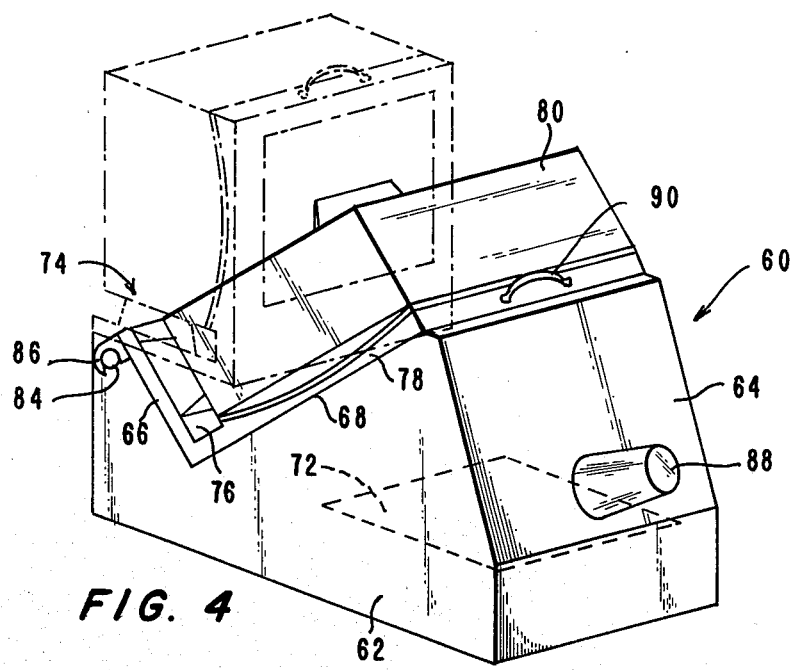
FIG. 4 is a perspective view of an alternative embodiment of the television projector apparatus including a pivotal platform.
Figure 5A:
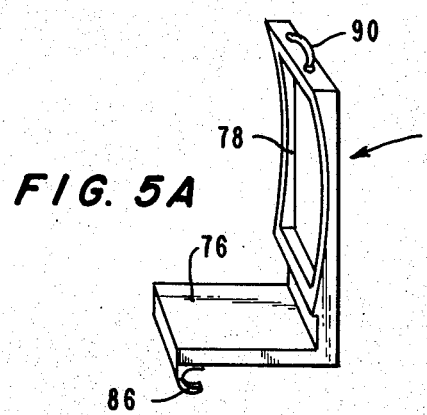
FIGS. 5A–5B are perspective views of the platform and housing of the television projector apparatus of FIG. 4.
Figure 5B:
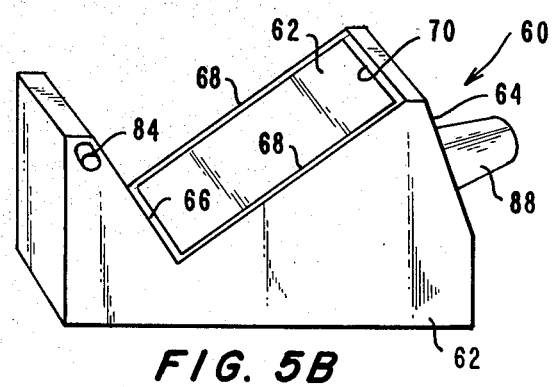

Referring to FIG. 4, an alternative embodiment of the invention may be constructed as a projector unit, generally 60, which includes a housing comprising a pair of upstanding side walls 62 (one shown) and an inclined front wall 64. The upper portion of each side wall 62 is cut away to define oppositely inclined edges 66 and 68 which meet at right angles. The top of the projector housing together with inclined edges 68 provide an open top portion which defines a window opening 70 (FIG. 5B). A mirror 72 is located within the projector housing and disposed horizontally between side walls 62.

Figure 6A:
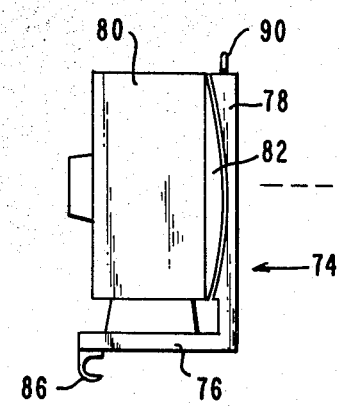
FIGS. 6A–6B are assembly views illustrating the installation of the television receiver and platform of the television projector apparatus of FIG. 4.

A platform, generally 74, pivotally attached at the rear of the projector housing includes a flat base 76 (FIG. 5A) and a frame member 78 extending perpendicularly upward from the base for supporting a television receiver 80 (FIG. 6A) with its viewing screen 82 received within the frame member. A pair of pivot pins 84 (one shown) are provided at the rear of the projector housing. A corresponding pair of curved pivot members 86 is provided on platform 76 which engage pivot pins 84 to pivotally support platform 74 on the projector housing. Preferably, frame member 78 is curved in configuration to conform to the curvature of viewing screen 82.

A projector lens 88 is mounted on inclined front wall 64 of the projector housing for receiving a television image reflected by mirror 72 from viewing screen 82 of television receiver 80 and projecting an enlargement of the television image. Preferably, the projector lens is adjustable to allow the projected image to be focused.

Figure 6B:
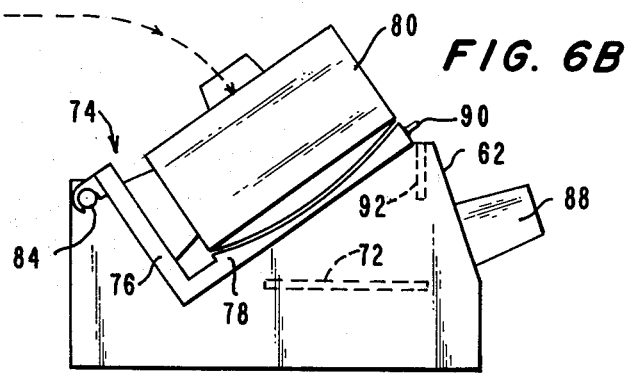

Pivotal platform 74 enables television receiver 80 to be installed in an upright position on base 76 (FIG. 6A) and permits the television receiver to be moved from side to side to accurately align the viewing screen 82 with frame member 78. Thereafter, platform 74 is pivoted downwardly (FIG. 6B) to tilt television receiver 80 so that its viewing screen 82 is inclined toward mirror 72 through the window opening in the projector housing. A handle 90 is mounted on top of frame member 78 to permit manual movement of platform 74 between its horizontal and inclined positions.

With television receiver 80 tilted into its operative position with viewing screen 82 inclined toward mirror 72, the television image on the viewing screen is reflected by mirror 72 and directed to projector lens 88 which magnifies the reflected image and projects an enlargement of the image on a viewing surface (not shown). Preferably, a light barrier 92 is located within the projector housing for blocking a direct light path between projector lens 88 and viewing screen 82 of the television receiver. The purpose of light barrier 92 is to ensure that only the reflected image from mirror 72 is directed to projector lens 88. If desired, the light barrier may be ajustable in height to allow the projector unit to accommodate television receivers with different sized viewing screens.

Figure 8:
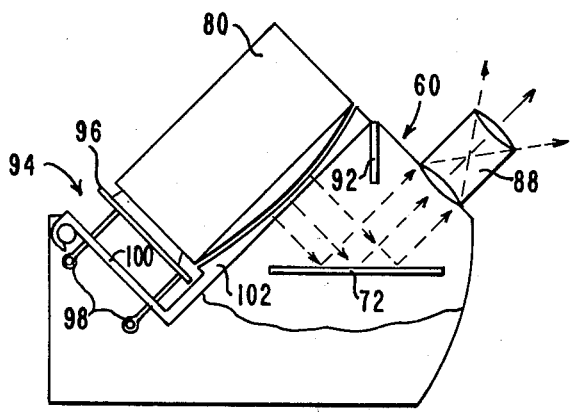
FIG. 8 illustrates an alternative embodiment of the television projector apparatus in which the pivotal platform is adjustable to accommodate different sized television receivers and/or receivers of different cabinet design or configuration.

As shown in FIG. 8, projector unit 60 may be provided with a pivotal television support 94 which is adjustable in height and angle to allow the projector unit to accommodate television receivers with screens disposed in different relationships to the base or chassis. Television support 94 includes an adjustable platform 96 mounted by a set of elongated screw members 98 to a flat base 100 provided with an upright frame member 102 adapted to receive the viewing screen of television receiver 80. The height and angle of platform 96 can be adjusted by turning screw members 98.

Figure 12:
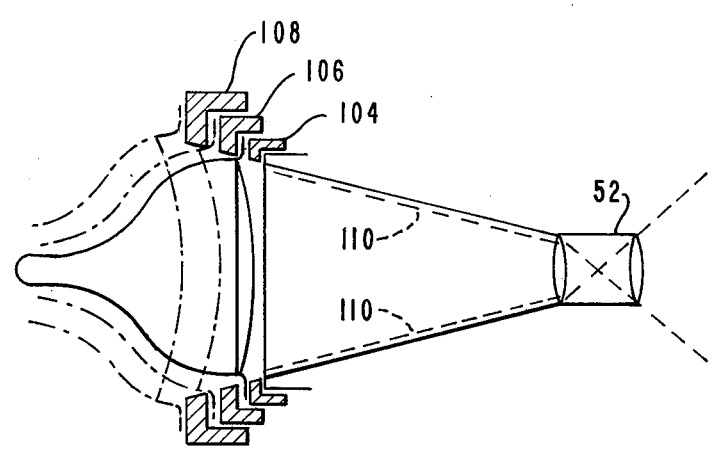
FIGS. 12 and 13 illustrate the use of adaptors which allow the television projector apparatus to accommodate television receivers with different sized viewing screens.
Figure 13:
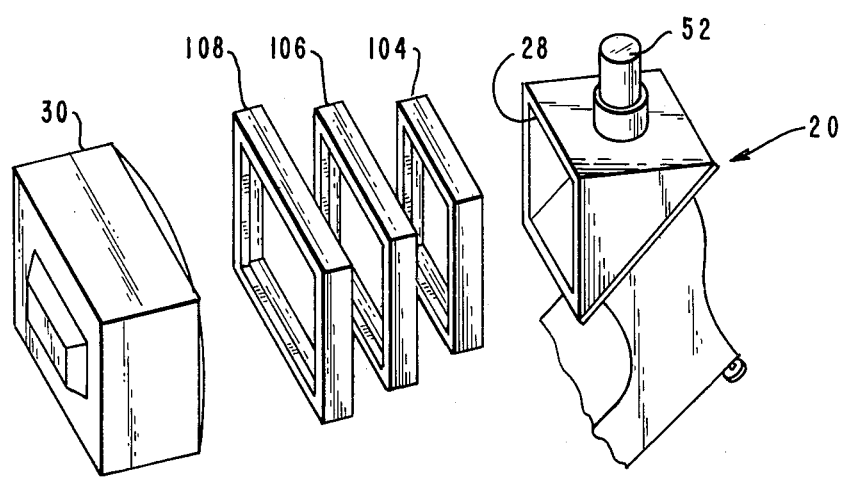

Referring to FIGS. 12 and 13, in accordance with a preferred feature of the invention, a plurality of adaptor members 104, 106, 108 may be provided to enable the television projector unit to accommodate television receivers with different sized viewing screens. Each adaptor member comprises a frame-like insert adapted to receive the viewing screen of the television receiver. When employed with projector unit 20 of FIG. 1, the smallest insert is adapted to fit around window opening 28. One or more progressively larger inserts 106 and 108 may be used with insert 104 to adapt window opening 28 to the television receiver.

As shown in FIG. 12, the effect of using one or more inserts is to displace the television picture tube away from lens 52 so that the entire viewing screen remains within the same field of view illustrated by lines 110, and at the same time the distance between the viewing screen and the reflective mirror is increased proportionally appropriate as the size of the viewing screen increases, thereby maintaining the ability to focus for the same range of sizes of the projected image. Further, if desired, the adaptors could be made to fit not only different sized viewing screens, but also to match individual television models to afford a more precise fit.

The height and angle adjustments of the platform are provided to enable the unit to adjust to television receivers with different sized viewing screens and/or with viewing screens disposed at different heights and/or different angles relative to the plane containing the receiver base, and/or disposed above, below, or to one side of the controls. Adapter pieces of varying thicknesses (not shown) may be provided to fit on the platform to enable the device of this invention to accommodate greater variations in television receiver sizes and configurations.

Alternatively, it is also contemplated that the projector unit may be constructed with the projector lens positions between the television receiver and the mirror. In such an embodiment, the lens is located inside the projector housing and the mirror reflects the enlarged image onto the viewing surface.

In conclusion, the television projector apparatus of this invention advantageously allows the television receiver to be installed in an upright position to permit convenient adjustment and alignment of its viewing screen relative to the mirror and projector lens of the apparatus. Thereafter, the projector apparatus permits the television receiver to be tilted into an operative position with its viewing screen inclined toward the mirror which reflects the television image from the viewing screen to the projector lens to project an enlarged image in a desired direction. The apparatus is conveniently adaptable to accommodate television receivers with different sized viewing screens, and/or with viewing screens oriented at different heights and/or different angles relative to the base of the receiver.

While specific embodiments of the invention have been shown and described in detail, it will be understood that the invention may be modified without departing from the spirit of the inventive principles set forth in the appended claims.

I claim:

1. An apparatus for projecting an enlarged image from the viewing screen of a television receiver mounted therein, comprising:
   a housing including a base, a pair of upstanding side walls, an inclined front wall, and a window opening for receiving the viewing screen of said television receiver, said base and front wall forming first and second support surfaces contained in respective intersecting planes which together form an obtuse angle, the window opening being contained in a plane substantially perpendicular to the plane containing the first support surface;
   a mirror located within said housing and disposed between said side walls, said mirror being contained in a plane substantially parallel to the plane containing the second support surface;
   a platform attached to said base of said housing for supporting the television receiver with its viewing screen received in said window opening in a position oriented toward said mirror, said platform being adjustable in height and angle to accommodate television receivers with differently sized viewing screens and/or with viewing screens disposed at different heights and/or different angles relative to the plane containing the receiver base and/or disposed above, below or to one side of the controls;
   a projector lens means mounted on said front wall of said housing for receiving an image reflected by said mirror from said viewing screen and for projecting an enlargement of said image; and
   said base of said housing being adapted to tilt from the first support surface wherein when a television receiver is mounted on said platform disposed in an upright position with its viewing screen contained in a plane disposed substantially perpendicularly to the first support surface into an operative position resting on the second support surface with the viewing screen received in the window opening and the screen contained in a plane disposed at an acute angle to the second support surface whereby said mirror will project the enlarged image of the viewing screen through said projection means in a desired direction.

2. The apparatus of claim 1, which includes:
   one or more inserts adapted to fit around said window opening and receive the viewing screen of said television receiver to accommodate television receivers with different sized viewing screens, and/or with differently contoured cabinets.

3. The apparatus of claim 1, which includes: a light barrier means located within said housing between the window opening and said projector lens means for blocking a direct light path therebetween.

4. The apparatus of claim 1, which includes: height adjusting means mounted on the second support surface on said base of said housing for adjusting the angle at which the enlarged image is projected.

* * * * *